United States Patent
Maruo et al.

[11] Patent Number: 5,253,085
[45] Date of Patent: Oct. 12, 1993

[54] VARIABLE SCANNING SPEED OPTICAL SCANNING DEVICE

[75] Inventors: Seizi Maruo, Hitachi; Yasuro Hori, Katsuta; Yasuaki Suzuki, Hitachi, all of Japan

[73] Assignee: Hitachi, Ltd., Tokyo, Japan

[21] Appl. No.: 765,521

[22] Filed: Sep. 25, 1991

[30] Foreign Application Priority Data

Sep. 25, 1990 [JP] Japan .................................. 2-251870

[51] Int. Cl.⁵ ............................................... G05B 19/10
[52] U.S. Cl. ...................................... 358/481; 358/486
[58] Field of Search ............................. 358/480–481, 358/486, 449, 487; 355/235; 346/108, 160; 250/235–236

[56] References Cited

U.S. PATENT DOCUMENTS

| | | | |
|---|---|---|---|
| 3,560,651 | 2/1971 | Roth | 358/486 |
| 3,848,087 | 11/1974 | Carrell | 358/481 |
| 4,523,093 | 6/1985 | Neumann | 358/487 |
| 4,923,263 | 5/1990 | Johnson | 250/235 |
| 4,962,981 | 10/1990 | Murakami et al. | 358/481 |
| 4,975,626 | 12/1990 | Yagi et al. | 346/108 |
| 5,046,796 | 9/1991 | Andoh et al. | 358/481 |

*Primary Examiner*—Stephen Brinich
*Attorney, Agent, or Firm*—Antonelli, Terry, Stout & Kraus

[57] ABSTRACT

An optical scanning device which can prevent increase of the weight or capacity involved with distortion correction to sufficiently correct the distortion at low cost. A correction arrangement is provided to control the rotating angular velocity of a scanning rotary mirror in accordance with the scanning position of a scanning face. By controlling the rotating angular velocity of the scanning rotary mirror, the distortion aberration on the scanning face is corrected so that sufficiently accurate optical scanning can be performed without optically correcting the distortion aberration.

4 Claims, 16 Drawing Sheets

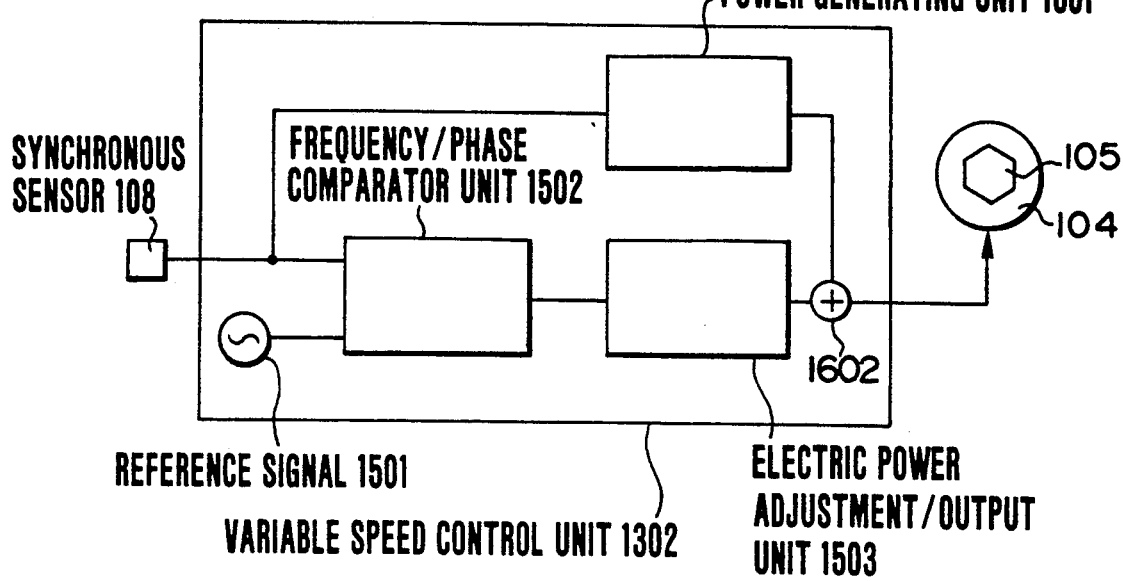
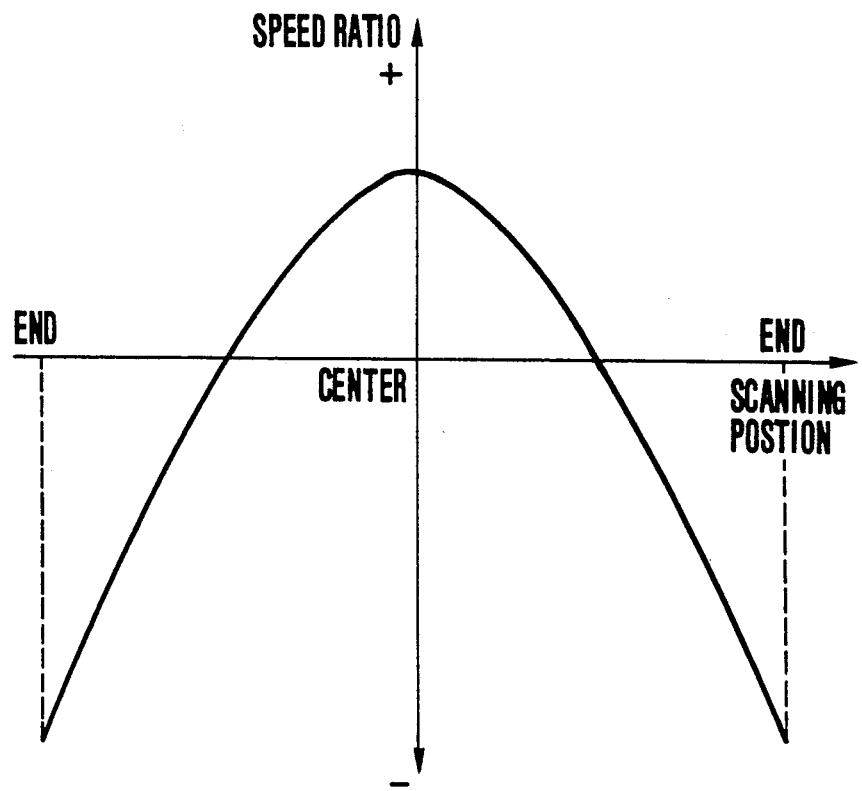

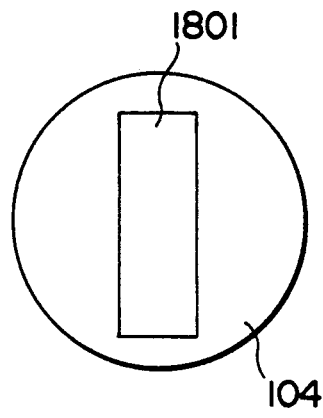
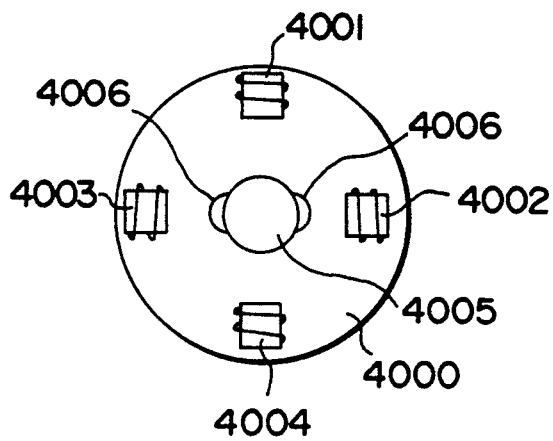
FIG. 19A    FIG. 19B
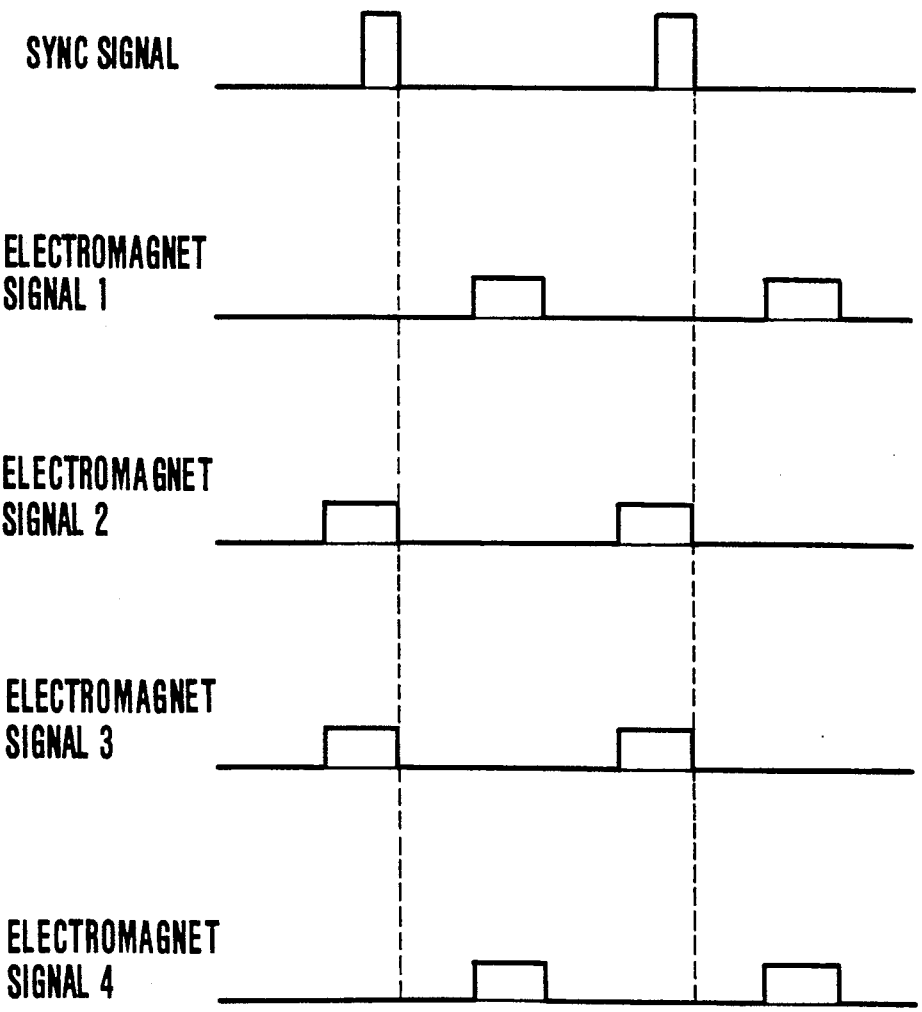
FIG. 20

LOAD CONTROL PORTION 4503

LOAD CONTROL PORTION 4503

VARIABLE SCANNING SPEED OPTICAL SCANNING DEVICE

BACKGROUND OF THE INVENTION

The present invention relates to an optical printer for e.g. a laser beam printer in which a rotating mirror is used to scan a light spot in a main scanning direction, and more particularly to an optical scanning device suited to a printer for a facsimile.

The performance of the optical scanning device used in e.g. a laser beam printer is greatly affected by the accuracy of correcting the distortion aberration involved with the linear scanning on a scanning face and the mechanical accuracy of a rotating mirror.

FIG. 25 shows a general arrangement of the optical scanning device. The light emitting from a laser light source 102 consisting of a laser, a coupling lens, a slit, etc. is focused by a cylindrical lens 103 in its sub-scanning direction, deflected by a scanning mirror which is driven by a scanning (rotary driving) motor 104 and scanned on the surface of a photosensitive member 109 (main scanning).

The cylindrical lens 103 and first and second f-$\theta$ lenses 106 and 107 are provided to make optical correction so that the above optical scanning is correctly made on the photosensitive member 109. More specifically, the cylindrical lens 103 and first and second f-$\theta$ lenses 106 and 107 are used in order to correct the scanning line shift necessarily generated although the scanning motor 104 and scanning mirror 105 are fabricated with high accuracy while the first and second f-$\theta$ lenses 106 and 107 are used to correct the image field curvature distortion and distortion aberration generated owing to linear scanning.

On the other hand, a synchronization sensor 108 is provided to detect the scanning position of the photosensitive member 109 so that the light is correctly scanned.

FIG. 26 shows the laser light-emitting signal emitting from the laser light source 102. The laser light source 102 emits an image signal 1102 at the timing when a synchronous signal 1101 has been received by the synchronization sensor 108. Incidentally, the image signal 1102 is composed of image ON signals 1102 and image OFF signals 1103 which have fixed periods, respectively.

As described above, generally, the distortion aberration in the optical scanning device is corrected using the f-$\theta$ lenses as shown in FIG. 25, but in addition to this technique, the method of making the light emitting timing variable is disclosed in JP-A-55-118012. FIG. 27 schematically shows the manner of light emission. If correction of the distortion aberration by means of the f-$\theta$ lens is not made, with the incidence angle of $\theta = 0$ at the center of the photosensitive member 109, the light scanned by the scanning mirror of FIG. 25 will become coarse with an increase of the distance $y = \tan \theta$ from the center to the end. In order to obviate such a difficulty as shown in FIG. 27, the light emission is corrected so that it is dense at the center and coarse at the end.

The above rotating angular velocity control and the light emission timing/light amount control may be combined. This can be performed by the following equation representative of a motor control movement:

$$I(d\omega/dt) + C\omega = T_0 + T_1 e^{jn\omega t}$$

I: inertial moment of the motor and mirror
C: bearing/windage loss
$T_0$: normal torque constant
$T_1$: control torque constant
n: number of mirror faces Now if the angular velocity is varied by $\pm 10\%$, the torque to be changed is 2-10 times as large as the normal torque, thus leading to a problem of endurance. In order to relax such a load, the control of timings of light emission is also used. Specifically, as shown in FIG. 30, in order to make uniform the spot size at the light receiving unit, the timing of light emission is made dense at the end and coarse at the center.

The other means of controlling the light emission is to change the rate of ON to OFF, i.e. duty, in one period of the strength of light power in the emitted light waveform shown in FIG. 30.

In order to fix the amount of received light, control is made so that the product of the time of light emission and the optical power is constant. However, if a saturated response area where sensitivity is saturated for light amount in the characteristic curve of the light amount vs. the sensitivity as shown in FIG. 31, is used, the optical power can be made constant without changing the light amount. Therefore, this prior art has a merit of simplifying a lens system.

Meanwhile, the scanning motor 104 is required to rotate at a fixed speed with high accuracy. In order to satisfy this requirement, the light receiving timing of the synchronization sensor 108 is fed back to a fixed speed control unit 1301 so that the electric power to be supplied to the scanning motor 104 is adjusted to provide the fixed speed.

FIG. 29 is a general arrangement of the fixed speed control unit 1301 of FIG. 28. The signal inputted from the synchronization sensor 108 and the reference signal 1501 are compared by a frequency/phase comparator unit 1502, and necessary electric power is supplied from an electric power adjustment/output unit 1503 to the scanning motor 104, thus realizing the fixed speed of the motor.

SUMMARY OF THE INVENTION

The prior art does not consider a complicated arrangement of correcting several kinds of distortions using an optical means, and has an obstacle in realizing the light weight and small size thereof at low cost.

An object of the present invention is to provide an optical scanning device which can sufficiently correct the distortions at low cost without increasing the weight and capacity involved with correction of the distortion.

In order to attain the above object, there is provided a rotating angular velocity control means for controlling the rotary angular speed of the scanning rotating mirror in accordance with the scanning position on a scanning face.

The distortion aberration on the scanning face is corrected by controlling the rotary speed of the scanning rotating mirror so that sufficiently accurate optical scanning is obtained without using the optical means of correcting the distortion aberration.

BRIEF DESCRIPTION OF THE DRAWINGS

FIG. 2 is a block diagram showing one embodiment of a variable speed control unit;

FIG. 3 is a graph showing the speed change characteristic in the scanning motor necessary to correct distortion aberration;

FIGS. 19A to 19B are views showing one embodiment of a system of generating an uneven magnetic field inside a motor;

FIG. 20 is a waveform chart of one example of an applied voltage;

DESCRIPTION OF THE PREFERRED EMBODIMENTS

A detailed explanation will be given of an optical scanning device according to the present invention with reference to several embodiments as shown.

FIG. 2 shows one embodiment of the present invention. This embodiment intends to correct the curvature aberration by changing the rotating speed of the scanning motor 104 in the prior art explained in connection with FIGS. 25 to 29 within one scanning period. To this end, a variable speed control unit 1302 as shown in FIG. 2 is provided in place of the fixed speed rotation control unit 1301 according to the prior art shown in these figures.

Figure 28:
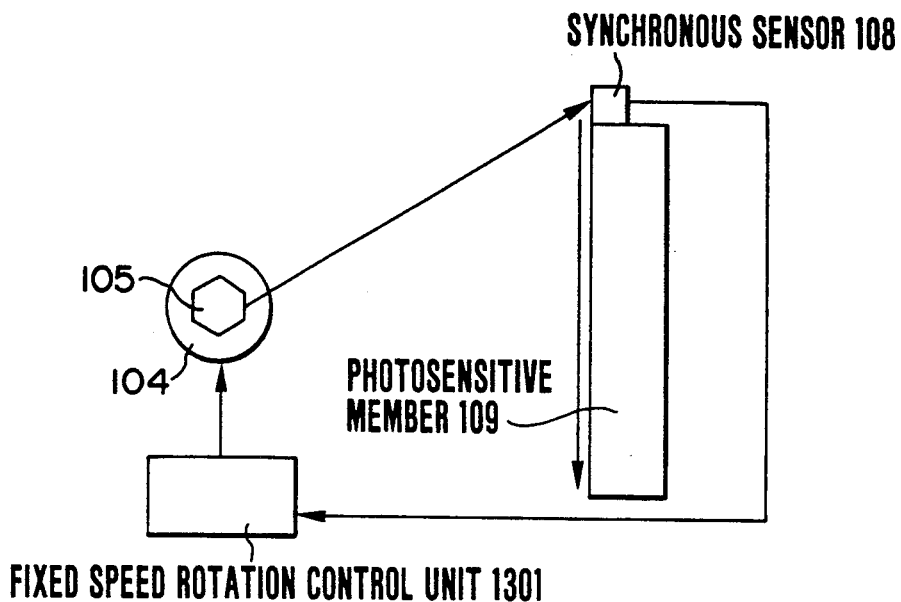
FIG. 28 is a view of an arrangement for rotating a scanning motor at a fixed speed.

Generally, the scanning motor 104 is required to rotate at a fixed speed at a high accuracy. In order to satisfy this requirement, as shown in FIG. 28, the light receiving timings of the synchronous sensor 108 are fed back to adjust the electric power be supplied by the fixed speed rotation control unit 1301 thereby to provide a fixed speed. On the other hand, in one embodiment of the present invention, the rotating speed is made variable so that the scanning speed using a light spot is fixed within one scanning speed. So, unlike the prior art shown in FIG. 27, it is not necessary to change the amount of light emission.

FIG. 3 shows a necessary change in the speed within one scanning period. It is necessary to realize the speed change as shown in FIG. 3 within one scanning period fixed. Therefore, the variable speed control unit 1302 as shown in FIG. 2 is provided.

Figure 29:
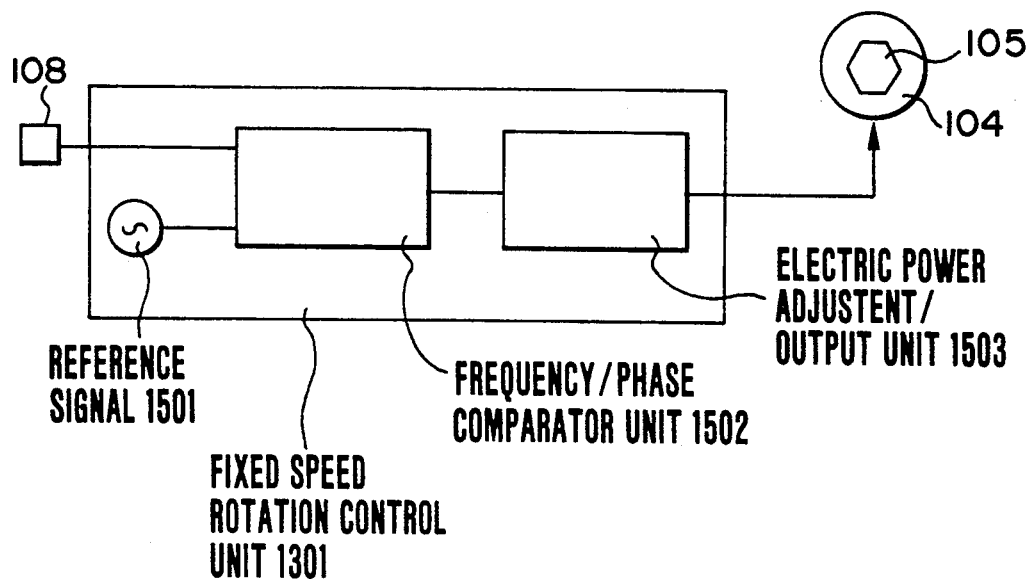
FIG. 29 is a block diagram of one example of a fixed speed rotation control unit.
Figure 30:
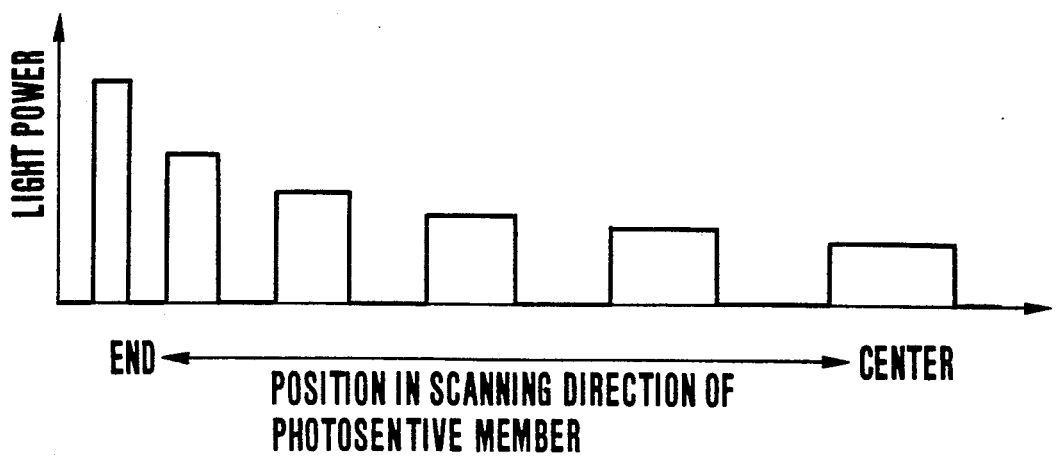
FIG. 30 is a waveform chart of timings of light emission.
Figure 31:
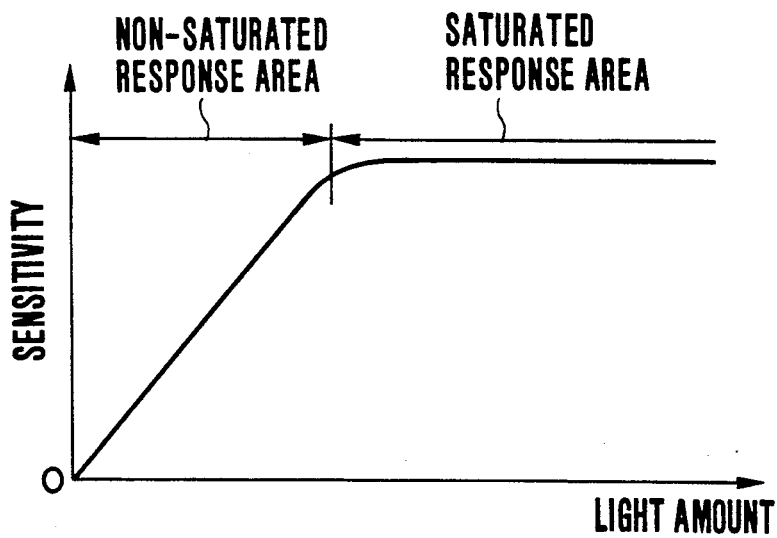
FIG. 31 is a graph showing the characteristic of a light receiving unit.

The variable speed control unit 1302 is, in addition to the arrangement of the fixed rotation speed unit 1301 in the prior art shown in FIG. 29, a weighting electric power generating unit 1601 for generating the speed change as shown in FIG. 3 and an electric power weighting unit 1602. Taking synchronization with an input signal from the synchronous sensor, the weighted electric power generating 1601 generates the electric power to be weighted.

Figure 4:
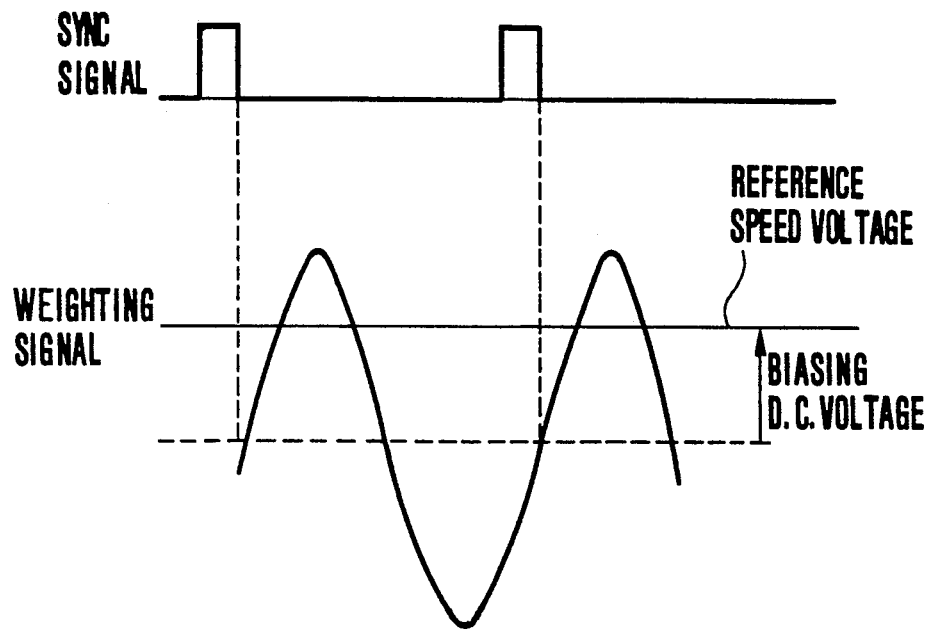
FIG. 4 is a waveform chart showing one of a weighting signal.
Figure 5:
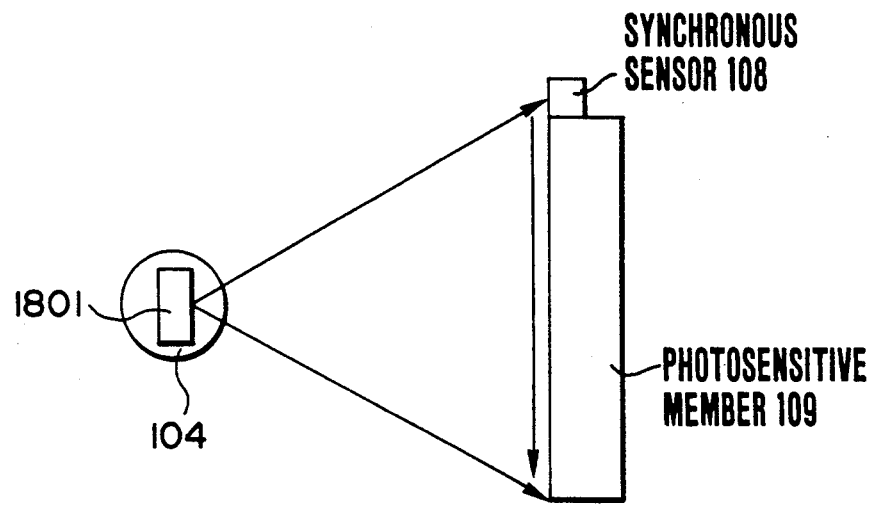
FIG. 5 is a view for explaining one embodiment of using a two-face scanning mirror.

FIG. 4 shows an example of a weighting signal necessary to provide a weighting electric power. Assuming that the rotating speed of the scanning motor 104 is proportional to the voltage applied to the scanning motor 104, as shown in FIG. 4, the weighted signal has only to take the form shown in FIG. 3: namely it takes the form of weighting a D.C. biasing voltage from an electric power adjustment/output unit 1503 with the an A.C. voltage having a predetermined peak value from a weighting electric power generating unit 1601. Incidentally, although in this embodiment, the electric power adjustment/output unit 1503 generating the D.C. biasing voltage E and the weighting electric power generating unit 1601 generating the A.C. voltage are individually provided, they may be provided in a mixed design. Further, as seen from the weighted signal shown in FIG. 4, the D.C. biasing voltage E may be set for the value which is lower than the rotating voltage of the corresponding scanning motor 104. The frequency of the A.C. voltage V should be set for the frequency of the number of faces of the scanning mirror 104 x the rotating speed since the signal from the synchronous sensor is used as a standard as apparent from FIG. 2.

Figure 6:
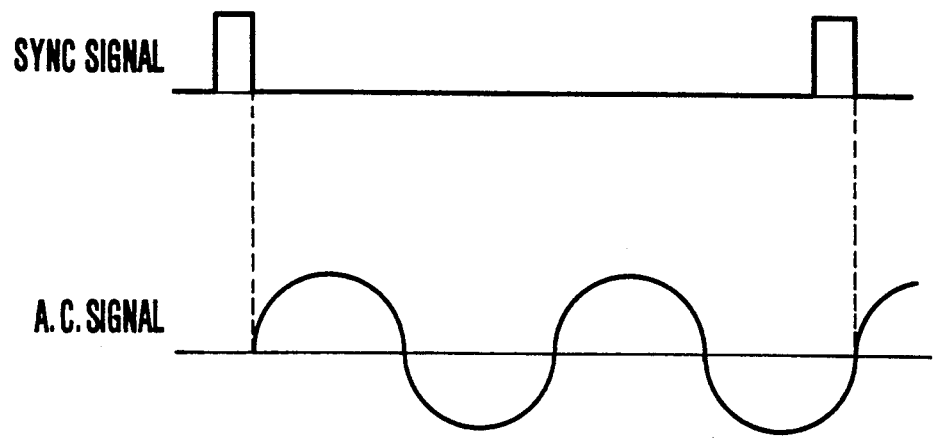
FIG. 6 is a waveform chart showing another example of the weighting signal.
Figure 7:
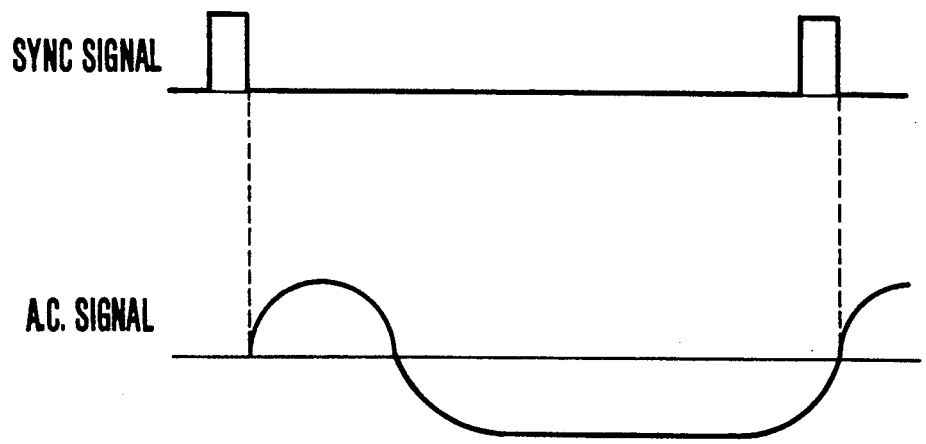
FIG. 7 is a waveform chart showing still another example of the weighting signal.

Meanwhile, the present invention can also be implemented using a two-face scanning mirror 1801. In this case, however, the effective scanning angle will be reduced. FIG. 6 shows an example of the synchronous signal and the A.C. voltage in this embodiment. As seen from the figure, the synchronous signal comes once every two periods of the A.C. voltage. Incidentally, if the effective scanning angle is small as in this embodiment, the synchronous signal may come one every n periods of the A.C. voltage. Further, as in FIG. 7, an A.C. waveform may be located at only the portion necessary for the synchronous signal and the waveform at the remaining portion may be optional.

Although it was assumed in the above embodiment that the rotating speed of the scanning motor 104 one-to-one corresponds to the applied voltage, the correspondence of one-to-one cannot be actually obtained because of an inertial force. Particularly, the inertial force is dominant during the period of deceleration so that reducing the applied voltage does not lower so greatly the rotating speed, thus making it difficult to control the rotating speed.

Figure 8:
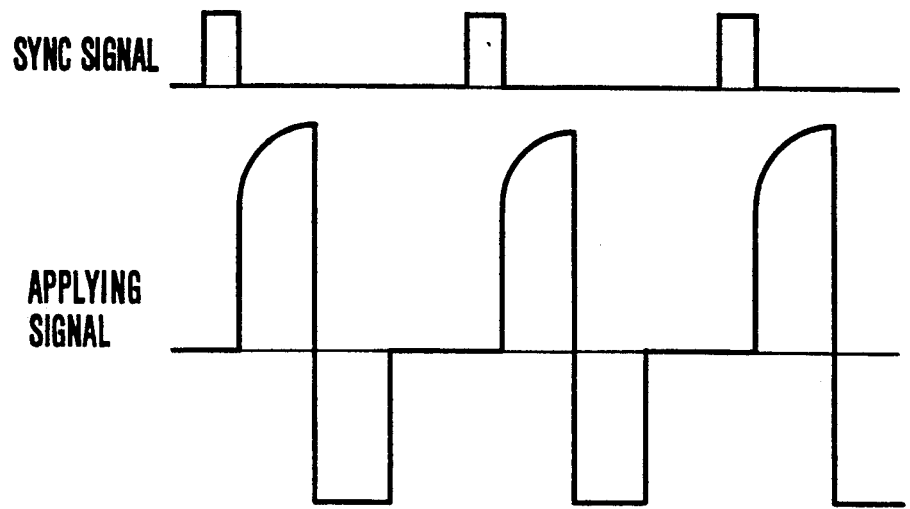
FIG. 8 is a waveform chart showing one example of a reverse-bias applying signal.
Figure 9:
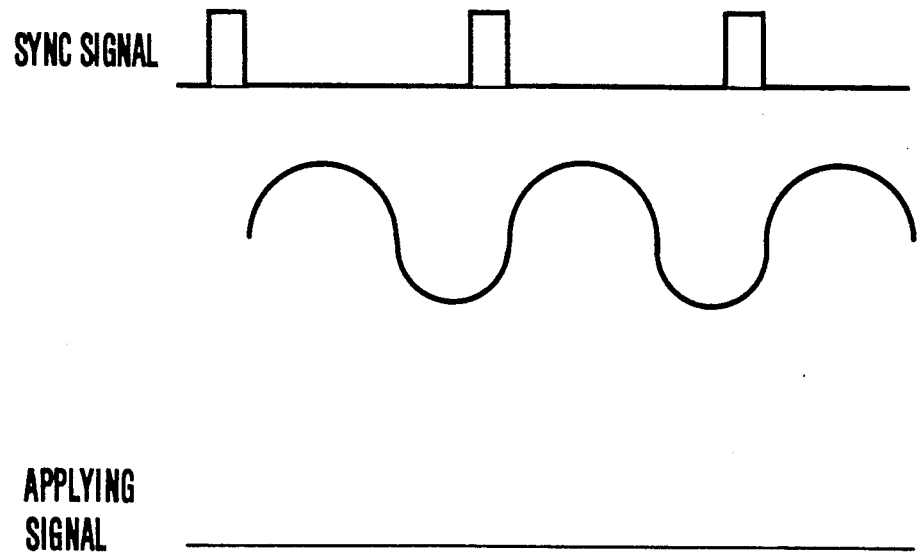
FIG. 9 is a waveform chart showing a further example of the weighting signal.

FIG. 8 shows one example of the weighting signal for obviating such inconvenience. Specifically, in the above embodiments, the voltage finally applied to the scanning motor 104 is the D.C. biasing voltage for producing the rotation in a positive direction weighted with the A.C. voltage. On the other hand, in the embodiment of FIG. 8, the biasing voltage in a reverse rotating direction is applied to overcome the inertial force in deceleration. Incidentally, although in this embodiment, the deceleration voltage has a square waveform, any waveform may be adopted in accordance with the necessary characteristic.

Figure 10:
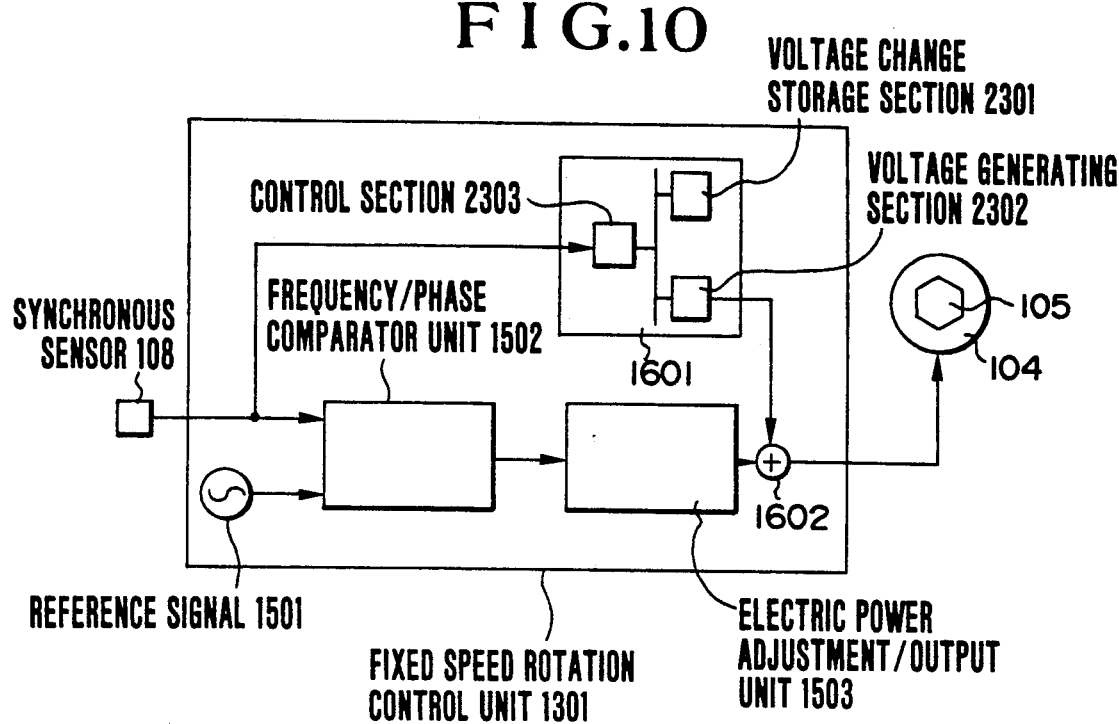
FIG. 10 is a block diagram of another embodiment of a variable speed control unit.

As described above, the voltage generated by the weighting voltage generating unit 1601 is not a simple sine wave. Therefore, although the waveform may be generated in hardware, it may be stored in a memory as in the embodiment of FIG. 10. In the embodiment of FIG. 10, a predetermined waveform is previously stored in the weighting electric power generating unit 1601 of the variable speed control unit 1302. For this purpose, a voltage change storage section 2301 of e.g. ROM is provided. In the weighting electric power generating unit 1601, in response to the signal from the synchronous sensor 108, a control section 2303 reads the voltage change and supplies the read voltage to a voltage generating section 2302 to generate a voltage.

Although in the embodiments described, the rotating speed of the scanning motor 104 was changed by changing the electric power to be supplied to the scanning motor 10, the rotating speed of the scanning motor 104 may be changed by changing the load to be applied to the scanning motor.

Figure 11:
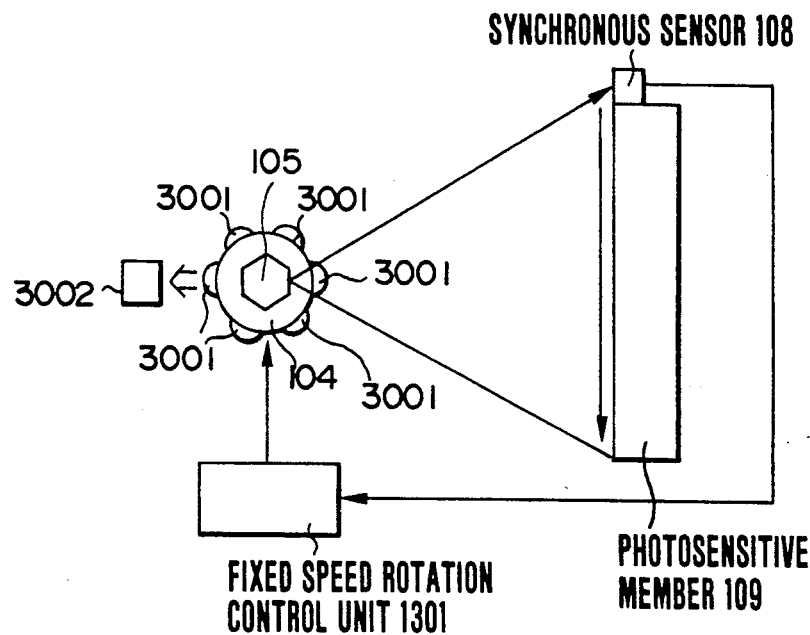
FIG. 11 is a view of one embodiment of the present invention.

FIG. 11 shows one embodiment for implementing this in which the load applied to the scanning motor 104 is controlled by a magnetic force to provide its speed change while constant speed control for the scanning motor as described in connection with the prior art of FIG. 28 is performed. In FIG. 11, motor unevenness portions 3001 which are made of a magnetic substance attached around the rotor of the scanning motor 104 or to the axle thereof serve to generate an absorption force and a repulsion force between them and a magnetic force generating portion 3002. Of course, this intends to provide the speed change as shown in FIG. 3.

Figure 12A:
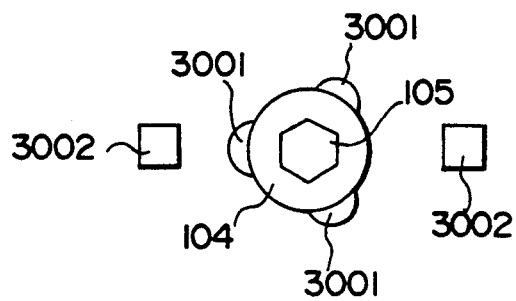
FIGS. 12A to 12D are views for explaining one embodiment of a motor unequal unit and a magnetic force generating unit.
Figure 12B:
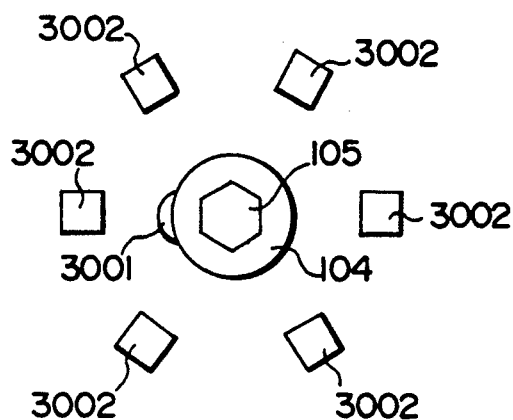
Figure 12C:
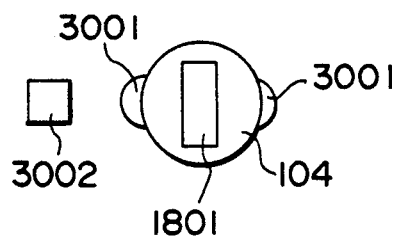
Figure 12D:
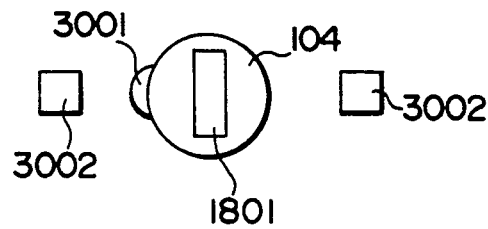
Figure 13A:
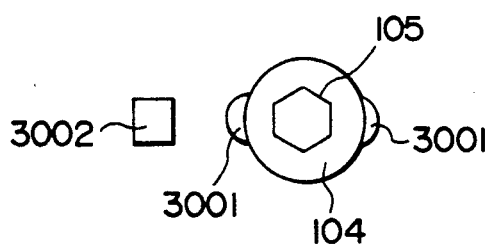
FIGS. 13A to 13D are views for explaining another embodiment of a motor unequal unit and a magnetic force generating unit.
Figure 13B:
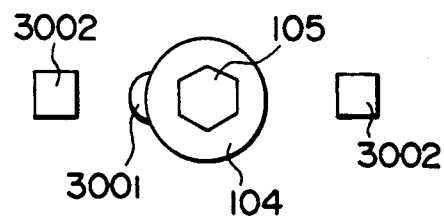
Figure 13C:
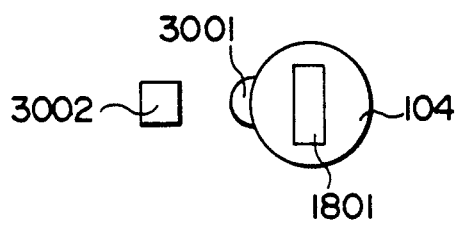
Figure 13D:
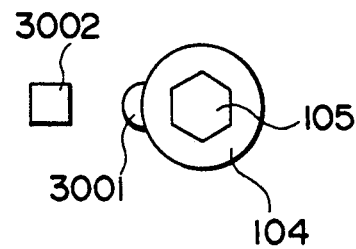
Figure 14A:
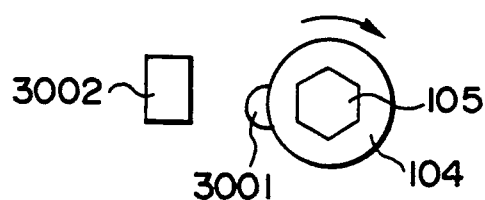
FIGS. 14A to 14D are views for explaining still another embodiment of a motor unevenness unit and a magnetic force generating unit.
Figure 14B:
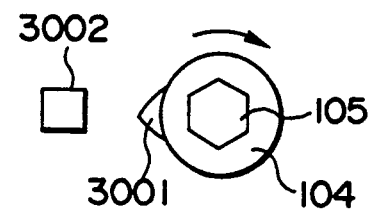
Figure 14C:
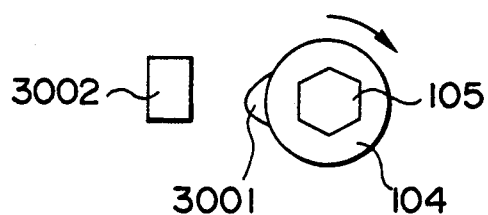
Figure 14D:
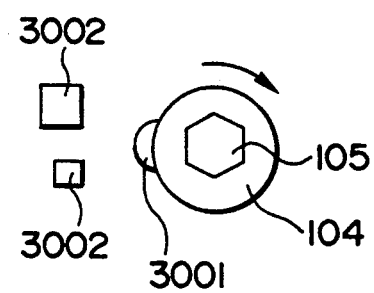

FIGS. 12A to 12D show embodiments of the motor unevenness portion 3001 and the magnetic force generating portion. In FIG. 12A, three motor unevenness portions 3001 and two magnetic force generating portions are provided for the scanning mirror 105 having six faces; in FIG. 12B, one motor unevenness portion 3001 and six magnetic force generating portions 3002 are provided for the scanning mirror 105 having six forces; in FIG. 12C, two motor unevenness portions 3001 and one magnetic force generating portion 3002 are provided for the scanning mirror 105 having two faces; and in FIG. 12D, two motor unevenness portions 3001 and one magnetic force generating portion 3002 are provided for the scanning mirror 105 having two faces. As apparent from these embodiments, any design may adopted as long as force is exerted for each rotation of a predetermined angle of the scanning motor 104, i.e. for each scanning period. Further, only m faces of n faces which can be scanned may be scanned in a manner of peculiar use. Several embodiments in this manner of use are shown in FIGS. 13A to 13D. Additionally, the magnetic force generating portions 3002 may be made of a permanent magnet or an electromagnet, i.e. any material as long as it can provide a necessary absorption force or repulsion force.

As described above, in the case where the speed of the scanning motor 104 is to be changed, a larger load is required in deceleration than in acceleration. Embodiments of the motor unevenness portions 3001 and the magnetic force generating force 3002 taking this point into consideration are shown in FIGS. 14A to 14D. In the embodiments of FIGS. 14A to 14D, the magnetic force generating portion 3002 is made of a permanent magnet; unevenness of the force applied to the rotation of the scanning mirror 105 is realized by unevenness in the structure of the motor uneven portion 3001 or the magnetic force generating portion 3002. Specifically, in FIG. 14A, the magnetic force generating portion 3002 is lengthened in an upward direction of the figure; in FIG. 14B, its position is shifted in the upward direction; in FIG. 14C, the shape of the motor unevenness portion 3001 is made asymmetric with respect to the rotation direction; and in FIG. 14D, a small and a large magnetic force generating portion 3002 are provided.

Figure 15:
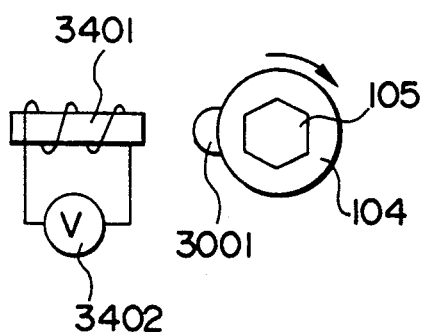
FIG. 15 is a view for explaining one embodiment using an electromagnet.
Figure 16:
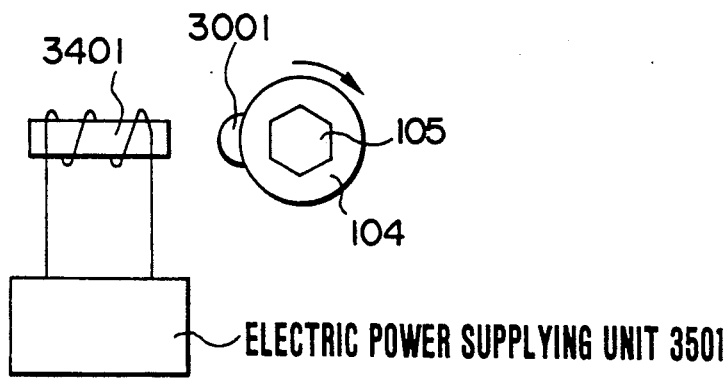
FIG. 16 is a view for explaining another embodiment using an electromagnet.

FIG. 15 shows an embodiment of the combination of the uneven motor portion 3001 and the magnetic force generating portion 3002 in which the magnetic force generating portion 3002 is made of an electromagnet. In this case, as shown in FIG. 16, the electric power to be supplied to the electromagnet is variably controlled for each of the scanning periods so that the above object, i.e. controlling the rotating angular velosity of the scanning motor 104 in one scanning period can be attained.

Figure 17:
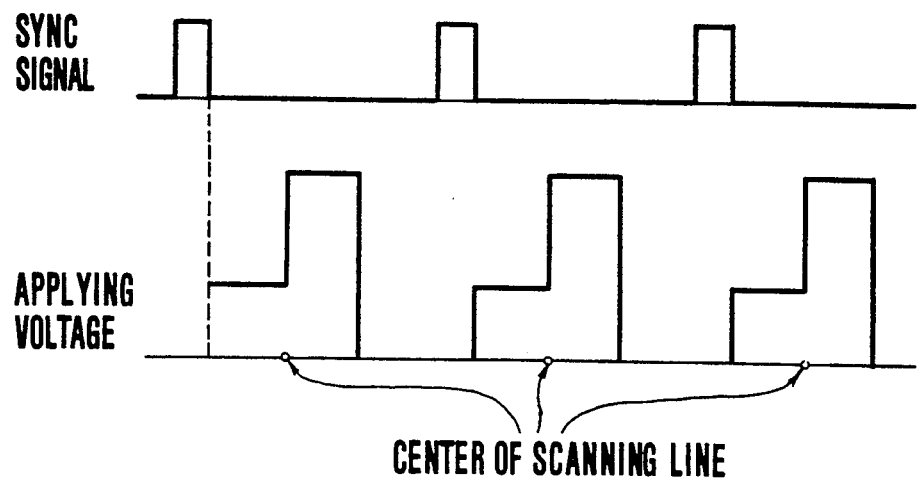
FIG. 17 is a waveform chart showing one embodiment of an applied voltage.

One example of the electric power supplying unit 3501 is shown in FIG. 17. This unit intends to strengthen the magnetic force in the neighborhood passing the central portion of a scanning line to increase a deceleration force.

Figure 18:
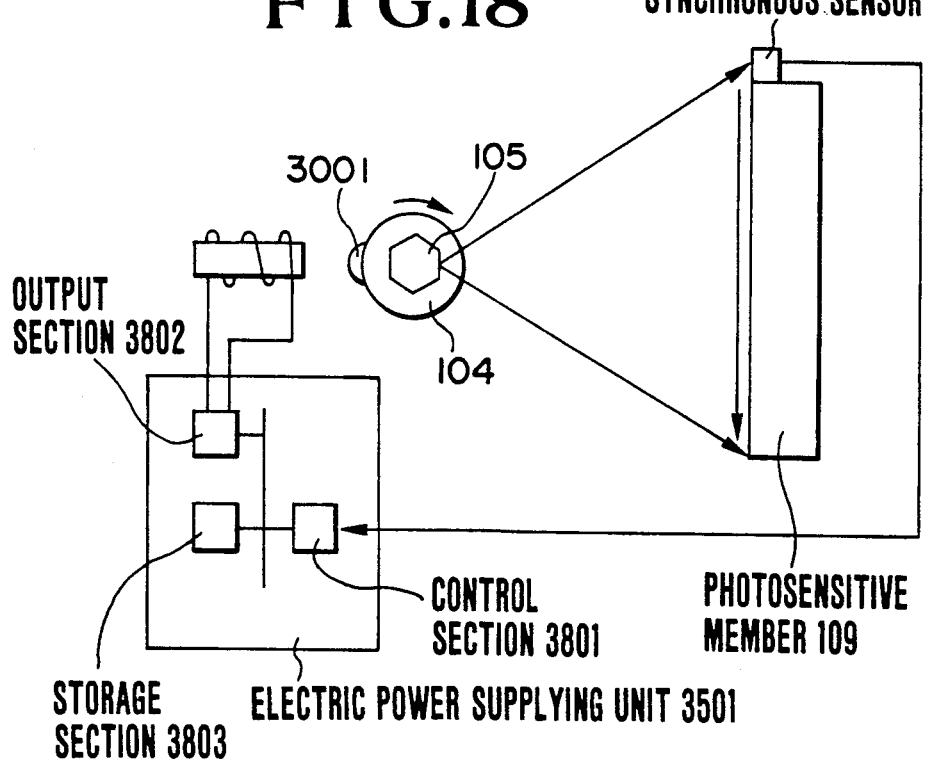
FIG. 18 is a view showing one embodiment of the present invention based on an electromagnet system.

Although the output voltage shown in FIG. 17 has a simple waveform, it is necessary to apply a voltage based on a combination of A.C. and D.C. to obtain a predetermined characteristic. This can be realized by the electric power supplying unit 3501 constructed as shown in FIG. 18. The electric power supplying unit 3501 includes a control section 3801 for generating a predetermined control output voltage in response to the signal from the synchronous sensor 108, a storage section 3803 for previously storing a predetermined voltage change and an output section 3802; the control output voltage from control section 3801 causes a data to be read from the storage section 3803 and the data to be outputted from the output section 3802.

Although in the above embodiment, the scanning motor 104 is externally provided with the load change generating means, it may be internally provided with a speed change generating means as shown in FIGS. 19A and 19B. Specifically, as shown in FIG. 19A, the scanning mirror 104 is provided with a two-face mirror 1801, and as shown in FIG. 19B, the inside 4000 of the scanning motor includes rotating shaft unevenness portions 4006 attached to the rotary shaft 4005 of the scanning motor (4006 is made of a magnetic material for making the motor shaft uneven) and four electromagnets 4001 and 4004. This embodiment uses that the electromagnetic absorption force appearing between the electromagnets and the motor unevenness portions 4006 can be controlled by applying a suitable voltage to these electromagnets.

Figure 21:
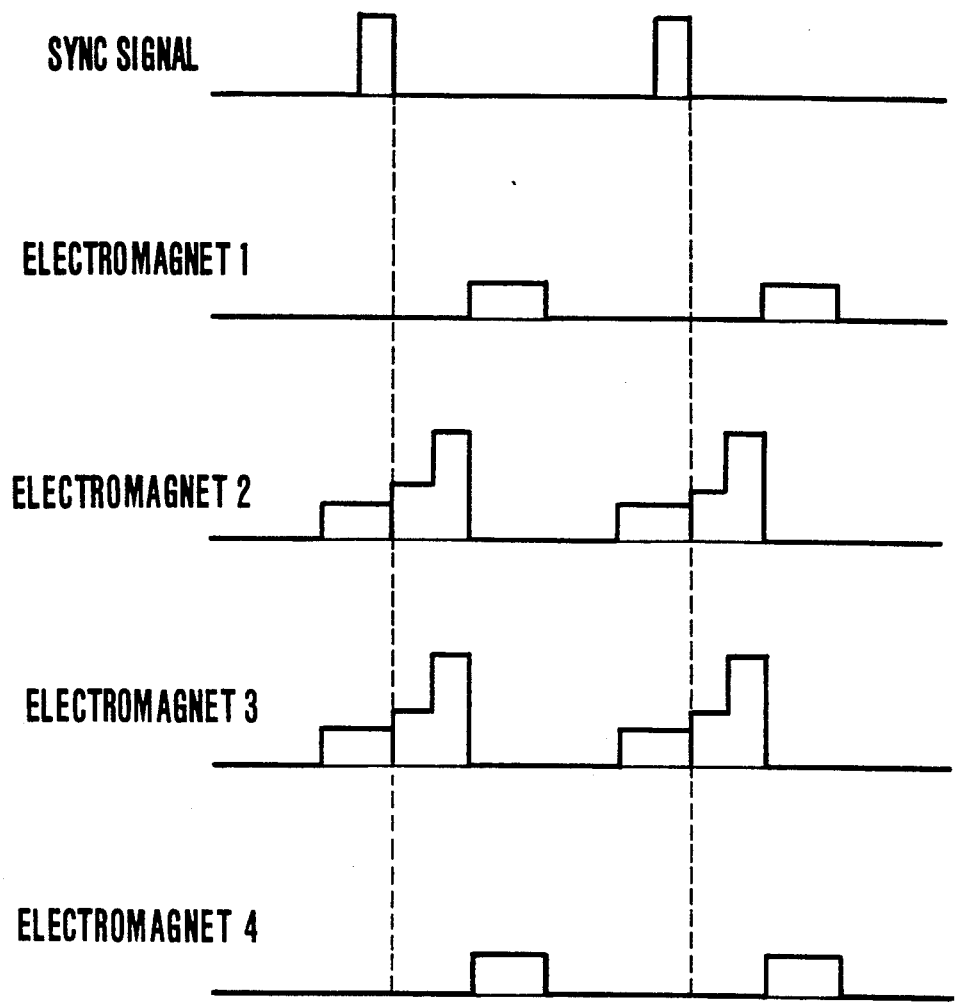
FIG. 21 is a waveform chart of another example of an applied voltage.
Figure 22:
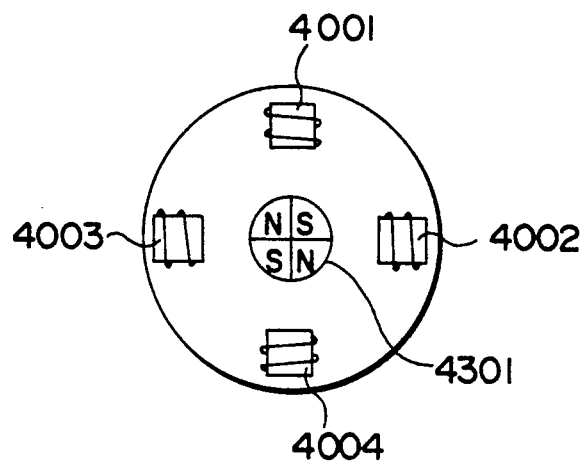
FIG. 22 is a view showing another embodiment of a system of generating an uneven magnetic field inside a motor.

One example of the voltages to be applied to the respective electromagnets 4001 to 4004 is shown in FIG. 20. This example relates to the case of rotating the motor at a fixed speed. The voltage as shown in FIG. 17 may be added to these voltages in order to make variable the speed within one scanning period as shown in FIG. 21. In the embodiment of FIG. 21, the resultant voltage has a very simple waveform, but actually it has a D.C. - A.C. combined complicate waveform.

Additionally, the scanning motor 104 may be designed in several structures other than the structures described above, e.g. in a structure provided with a polar rotating shaft 4301.

Further, although in the above embodiment, the magnetic means is used to apply a load to the rotating force of the scanning motor, any means such as a wind force may be used for this purpose as long as a predetermined controllable load is given.

Figure 23A:
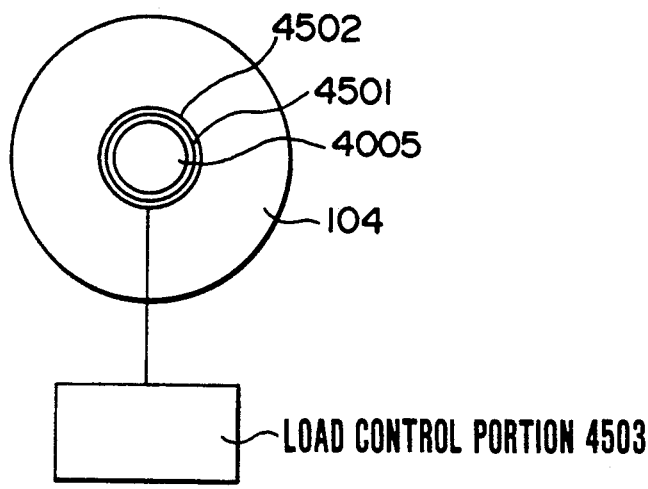
FIGS. 23A and 23B are a view for explaining one embodiment of the present invention based on a rotary load controlling system.
Figure 23B:
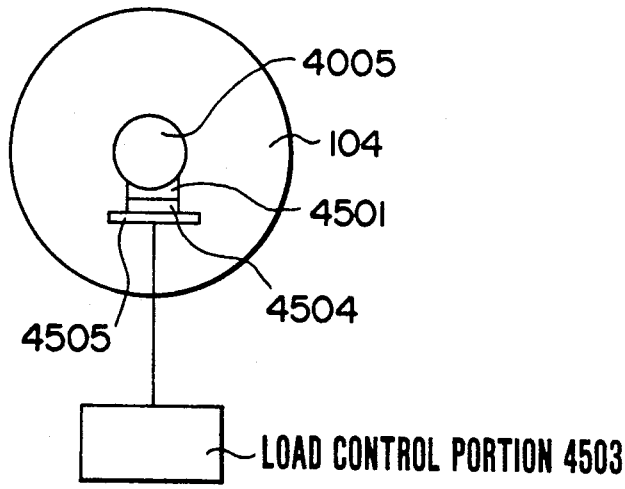

FIGS. 23A and 23B show embodiments of the present invention in which a friction braking force is used as means of applying the load to the rotating force of the scanning motor. In the embodiment of FIG. 23A, an elastic portion 4501 is provided around the rotary shaft 4005 of the scanning motor 105 and a load generating portion 4502 is provided around the elastic portion 4501. In operation, a control signal applied from the load control portion 4503 to the load generating portion 4502 causes the load control portion 4503 to shrink. The friction force generated thus between the elastic portion 4501 and the load generating portion 4502 applies frictional brakes to the rotary shaft 4005, thereby controlling the rotary angular velosity. In the embodiment of FIG. 23B, a piezoelectric element 4005 is used to apply the frictional brakes to the rotary shaft 4005; 4505 denotes a stopper.

Meanwhile, as described above, controlling the rotary angular velocity of the scanning motor 1004 is more problematic in its decreasing than its increasing. This is because in order to increase the speed, the electric power to be supplied to the motor has only to be increased while in order to decrease the speed, only decreasing the electric power to be supplied is not sufficient i.e. does not directly lead to reduction of the rotary angular speed because of the inertial force of rotation.

Figure 24A:
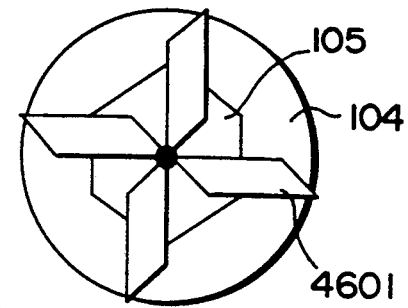
FIGS. 24A and 24B are a view for explaining one embodiment of the present invention based on a normal load generating unit.
Figure 24B:
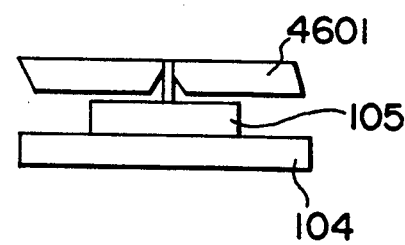
Figure 25:
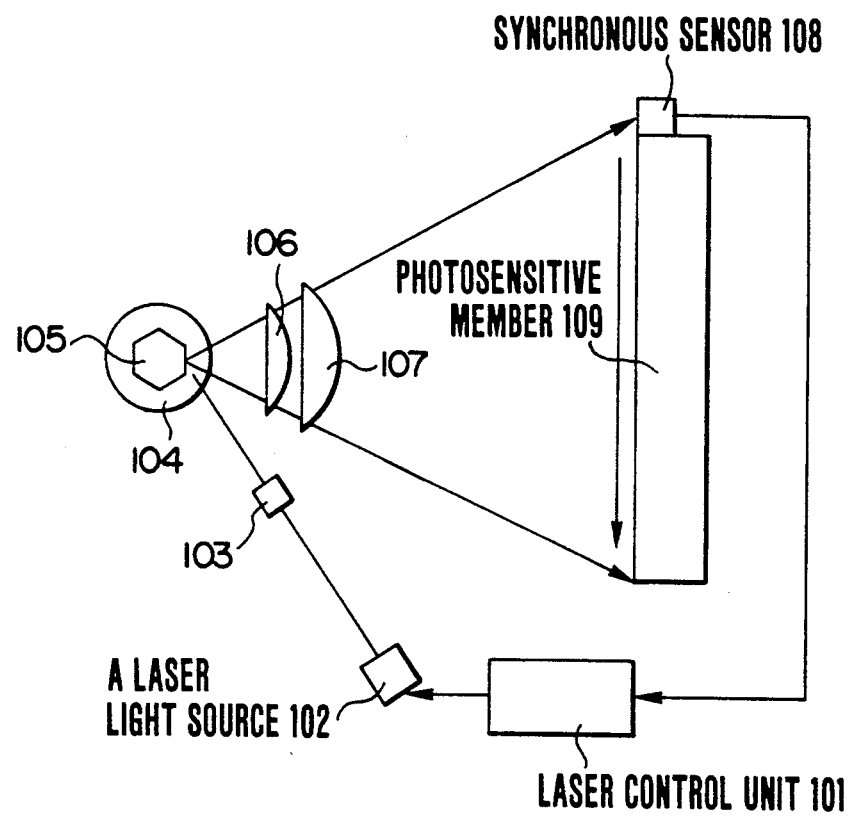
FIG. 25 is a view showing an arrangement of the prior art optical scanning device.
Figure 26:
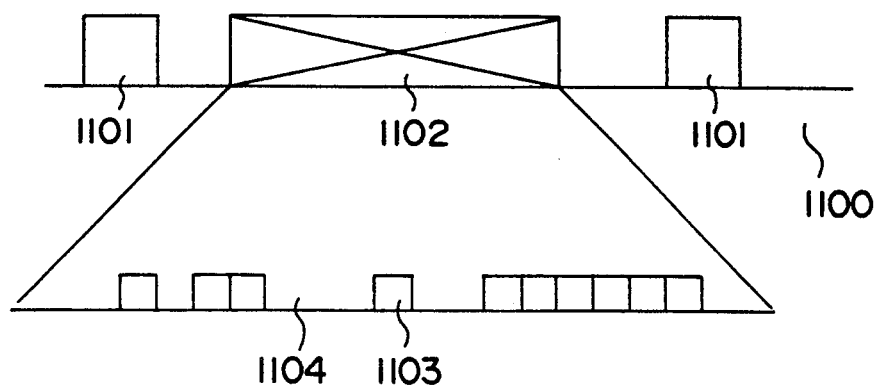
FIG. 26 is a view for explaining one example of a laser light emitting signal.
Figure 27:
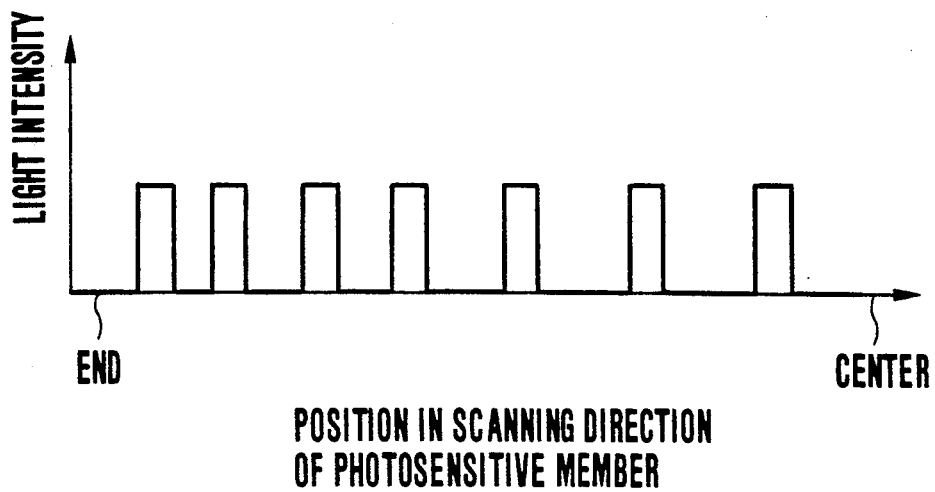
FIG. 27 is a view for explaining correction of a curvature aberration due to laser light emission according to the prior art.

For this reason, overlooking reduction of the efficiency, means for constantly giving a rotation resistance in the rotation direction of the motor may be provided as shown in FIGS. 24A and 24B. FIG. 24A is a front view and FIG. 24B is a side view.

In FIGS. 24A and 24B, 4601 denotes a stationary load generating portion. This portion is constructed by blades which generate wind loss involved with the rotation of the scanning motor 104 to absorb the torque. In this way, when the electric power supplied to the scanning motor 104 is reduced to lower the rotary angular speed, the rotating speed of the scanning motor is abruptly reduced because of redundant rotation resistance given by the blades of the stationary load generating portion 4601, thus easily providing a necessary response characteristic.

Additionally, the stationary load generating portion 4601 may be constructed by fans for cooling the motor; in this case, reduction in the efficiency can be greatly prevented. Further, the stationary load generating portion 4601 can use several methods of friction loss and eddy current loss as well as windage loss.

Although the techniques relative to the embodiments described above intend to correct curvature aberration, the same object can be attained by vibrating the motor itself.

Figure 1:
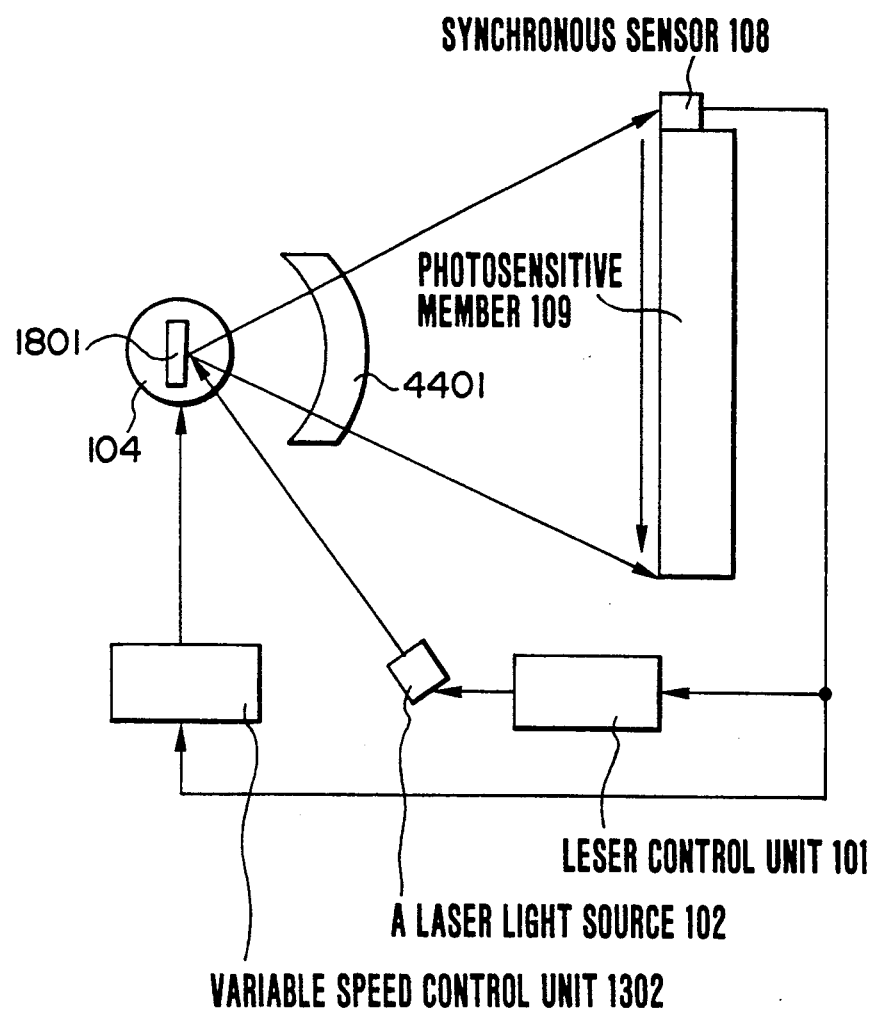
FIG. 1 is a view of an arrangement of one embodiment of the optical scanning device according to the present invention.

FIG. 1 shows one embodiment of the present invention in which a two-face scanning mirror 1801 is used minimize the face distortion so that the face distortion is not particularly corrected ('face distortion correctionless system'), a sphere lens 4401 is used to correct the field curvature, and control of the rotary speed of the scanning motor 104 is used to correct the distortion aberration.

In accordance with this embodiment, scanning with high accuracy can be realized without using the optical correction means such as a cylindrical lens and an expensive f-$\theta$ lens so that the optical scanning device having light weight can be fabricated at low cost. This makes it easy to apply such an optical scanning device to a facsimile or the like.

As guessed from the above description, a demand for high quality in a laser printer will be increasingly enhanced. Therefore, further strict conditions will be given to the field curvature and the distortion aberration. Completely adopting correction based on an optical lens system for satisfying the above requirement makes it difficult to realize compactness/light weight and low cost of the optical scanning device. If part of the distortion aberration is corrected by controlling the rotating angular velocity of the scanning motor 104, the scanning with sufficient accuracy can be realized by the lens system with a simple design. Thus, as described above, the light weight and low cost in the optical scanning device can be realized, thus making it easy to apply the optical scanning device to the facsimile or the like.

The optical scanning device according to the present invention can be applied to a laser beam printer as described above, and also can be applied to a scanner as it is.

The liquid crystal lens can be applied to a compact disk (CD) player, a camera, an optical measuring device, etc. Further, the motor control according to the present invention can be applied to an electric motor, or the like.

In accordance with the present invention, the distortion aberration can be sufficiently corrected without using a complicate optical system so that great reduction in th production cost of the device as well as its compactness and light weight can be easily realized.

We claim:

1. An optical scanning device wherein a part of an optical path from a light source to a scanning face is deflected by rotating a scanning rotary mirror so as to linearly scan the scanning face with a light spot, the optical scanning device comprising angular velocity control means for controlling a rotary angular speed of the scanning rotary mirror in accordance with a scanning position on the scanning face, the rotating angular velocity control means including correcting means for generating at least one of magnetic power and friction power, the correcting means adding at least one of a positive and a negative driving force changing in accordance with the scanning position on the scanning face to a predetermined rotary driving source supplied to a rotary shaft of the scanning rotary mirror.

2. An optical scanning device according to claim 1, wherein the correcting means supplies an additive rotary resistance to the rotary shaft of the scanning rotary mirror.

3. An optical scanning device according to claim 1, wherein the correcting means for generating friction power includes a cooling fan of a motor for rotating the scanning rotary mirror and supplying a friction resistance by wind loss of the cooling fan.

4. An optical scanning device according to claim 1, wherein the correcting means for generating magnetic power includes first magnetic power generating means provided at a position corresponding to a central portion of a mirror face of the scanning rotary mirror and second magnetic power generating means provided at a fixed position corresponding to the first means.

* * * * *